(12) United States Patent
LeStrange et al.

(10) Patent No.: US 10,821,746 B2
(45) Date of Patent: Nov. 3, 2020

(54) DEVICE FOR PROVIDING MULTIPLE SURFACE TREATMENTS TO THREE-DIMENSIONAL OBJECTS PRIOR TO PRINTING AND SYSTEM USING THE DEVICE

(71) Applicant: Xerox Corporation, Norwalk, CT (US)

(72) Inventors: Jack T. LeStrange, Macedon, NY (US); Anthony S. Condello, Webster, NY (US); Mandakini Kanungo, Penfield, NY (US); Peter J. Knausdorf, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/371,467

(22) Filed: Apr. 1, 2019

(65) Prior Publication Data
US 2019/0224992 A1 Jul. 25, 2019

Related U.S. Application Data

(62) Division of application No. 15/586,444, filed on May 4, 2017, now Pat. No. 10,300,711.

(51) Int. Cl.
| | |
|---|---|
| *B41J 11/00* | (2006.01) |
| *B41J 3/407* | (2006.01) |
| *B23K 7/06* | (2006.01) |
| *H05H 1/00* | (2006.01) |
| *B23K 10/00* | (2006.01) |
| *B23K 28/02* | (2014.01) |

(52) U.S. Cl.
CPC ............. *B41J 11/0015* (2013.01); *B23K 7/06* (2013.01); *B23K 10/003* (2013.01); *B23K 28/02* (2013.01); *B41J 3/4073* (2013.01); *H05H 1/00* (2013.01)

(58) Field of Classification Search
CPC .. B41J 11/0015; B41J 3/4073; B41M 5/0011; B41M 5/0082; H05H 1/2406; H05H 2001/2412; H05H 2001/2418
USPC ................................ 347/101, 102, 104–106
See application file for complete search history.

(56) References Cited

U.S. PATENT DOCUMENTS

| | | | |
|---|---|---|---|
| 6,424,091 B1 | 7/2002 | Sawada et al. | |
| 6,677,550 B2 | 1/2004 | Förnsel et al. | |
| 6,981,767 B2 | 1/2006 | Schmitt et al. | |
| 8,985,758 B2 * | 3/2015 | Mettu | B41J 2/01 347/103 |
| 9,969,185 B1 * | 5/2018 | Condello | B41J 11/002 |
| 10,016,997 B1 | 7/2018 | LeStrange et al. | |
| 2004/0091633 A1 | 5/2004 | Wilson, II et al. | |
| 2005/0118350 A1 | 6/2005 | Koulik et al. | |

* cited by examiner

*Primary Examiner* — An H Do
(74) *Attorney, Agent, or Firm* — Maginot Moore & Beck LLP

(57) ABSTRACT

A surface treatment system includes a holder configured to secure an object within the holder and a surface treatment device that is configured to treat a surface of the object within the holder with two types of surface treatments. The device is capable of producing a plasma or a flame at its nozzle for surface treatment. By controlling the materials supplied to the device and the way in which is operated, either a flame or plasma is produced. Thus, the surface treatment system is capable of treating a wide range of materials for printing by a direct-to-object printer.

15 Claims, 3 Drawing Sheets

DEVICE FOR PROVIDING MULTIPLE SURFACE TREATMENTS TO THREE-DIMENSIONAL OBJECTS PRIOR TO PRINTING AND SYSTEM USING THE DEVICE

PRIORITY CLAIM

This application is a divisional application of and claims priority to pending U.S. patent application Ser. No. 15/586,444, which is entitled "Device For Providing Multiple Surface Treatments To Three-Dimensional Objects Prior To Printing And System Using The Device," which was filed on May 4, 2017, and which issued as U.S. Pat. No. 10,300,711 on May 28, 2019.

TECHNICAL FIELD

This disclosure is directed to printers and, more particularly, to systems for treating the surfaces of three-dimensional (3D) objects to prepare the surfaces for printing.

BACKGROUND

Printers have been developed that can print text and graphics with multiple colors directly onto the surface of 3D objects. These printers, known as direct-to-object (DTO) printers, enable a small number of objects, even a single object, to have their surfaces printed with indicia and text. These printers are particularly advantageous in retail environments where unprinted objects can be kept and then printed to provide customized appearances to the objects. This flexibility enables an unprinted inventory of objects, such as various types of balls used in various sports, to be kept at the location and then printed with the logos of particular teams. Consequently, an inventory of objects with a particular logo or color scheme is not required.

One of the issues related to printing objects with a DTO printer is the wide variety of materials, such as metal, plastics, fabrics, and the like, that are used to make the 3D objects. These different materials have a corresponding wide range of surface energies. The surface energies of many of these materials adversely impact the adhesion and durability of ink images on these surfaces. Some of these materials require some type of surface pretreatment to increase the surface energy of the material for durable printing. Typical surface treatment processes include but are not limited to: (1) general cleaning using detergents or solvents, (2) texturing using sanding, sandblasting, plasma etching or the like, (3) low pressure plasma exposure or plasma etching, (4) atmospheric pressure plasma treatments, such as corona, chemical corona, blown arc, plasma jet, and blown ion processes, (5) the application of chemical primers, and (6) flame treatment of surfaces.

Currently, many facilities having DTO printers manually treat the objects prior to printing. Objects requiring only hand buffing and an isopropyl alcohol (WA) wipe are amendable to manual treatment, while other objects requiring more involved treatments, such as significant exposure time in a low pressure plasma chamber, are not as amenable. Other objects may require a series of different types of surface treatment to achieve optimal results. For instance, some objects are best prepared for printing by hand buffing the object, then applying an IPA wipe followed by flame treatment of the surface. The useful lifetime of surface treatments is variable and range from a few minutes to months depending on the material treated, the process used to treat the material, and the environment in which the object is stored. The general rule of thumb is that the more aggressive the treatment is to get an ink to wet and adhere to a material, the shorter the duration of the treatment. Therefore, a system that successfully treats a wide range of materials and treats the objects immediately prior to printing would be useful.

SUMMARY

An object surface treatment device provides at least two types of surface treatments to raise the surface energies of objects to improve the printing of the objects with DTO printers. The device includes a holder configured to secure an object within the holder, and a surface treatment device configured to produce both a plasma and a flame, but not both simultaneously, to treat a surface of the object within the holder with a flame alone, a plasma alone, or both a plasma and a flame.

Another embodiment of the object surface treatment device includes a holder configured to secure an object within the holder, a surface treatment device configured to produce both a plasma and a flame, but not both simultaneously, to treat a surface of the object within the holder with a flame alone, a plasma alone, or both a plasma and a flame, a support member to which the surface treatment device is mounted, an actuator operatively connected to the surface treatment device, a plurality of sources configured for connection to the surface treatment device, a controller operatively connected to the actuator and the plurality of sources. The controller is configured to operate the actuator to move the surface treatment device along the support member to a position opposite the object in the holder, to pneumatically couple each source in the plurality of sources to the surface treatment device independently of the other sources in the plurality of sources, and to operate the surface treatment device for treatment of the surface of the object with the plasma alone, the flame alone, or both the plasma and the flame.

Another embodiment of the object surface treatment device includes a housing with at least one wall forming an internal chamber, a portion of the wall forming a nozzle that fluidly communicates with the internal chamber, an electrode that extends into the internal chamber of the housing, an igniter positioned adjacent the nozzle, a first input in the housing to enable a source of combustible substance to be operatively connected to the internal chamber of the housing, a second input in the housing to enable a source of a plasma gas to be operatively connected to the internal chamber of the housing, and a third input in the housing that enables a high voltage source to be operatively connected to the electrode.

A printer incorporates the surface treatment device to enable the surface energy of objects made from a wide range of materials to be raised immediately prior to printing by the printer. The printer includes a surface treatment system having a surface treatment device that is configured to produce both a plasma and a flame, but not both simultaneously, to treat a surface of the object within the holder with a flame alone, a plasma alone, or both a plasma and a flame, and a printing system having at least one printhead configured to eject marking material, the printing system being configured to receive an object conveyed from the surface treatment system after the object has had at least a portion of the surface of the object treated by the surface treatment device to enable the printing system to eject marking material onto the portion of the surface of the object treated by the surface treatment device.

A method of operating a printer having an object surface treatment device enables the surface energy of objects made from a wide range of materials to be raised immediately prior to printing by the printer. The method includes operating a surface treatment device within a surface treatment system to treat at least a portion of a surface of an object positioned within the surface treatment system with either a plasma or a flame, the surface treatment device being configured to produce both a flame or a plasma independently of one another, directly conveying to a printing system from the surface treatment system an object that has had at least the portion of the surface of the object treated by the surface treatment device in the surface treatment system, and operating at least one printhead in the printing system to eject marking material onto the portion of the surface of the object treated by the surface treatment device in the surface treatment system.

BRIEF DESCRIPTION OF THE DRAWINGS

The foregoing aspects and other features of an object surface treatment system that provides a plurality of surface treatments to raise the surface energies of objects to improve the printing of the objects with DTO printers are explained in the following description, taken in connection with the accompanying drawings.

DETAILED DESCRIPTION

Figure 1:
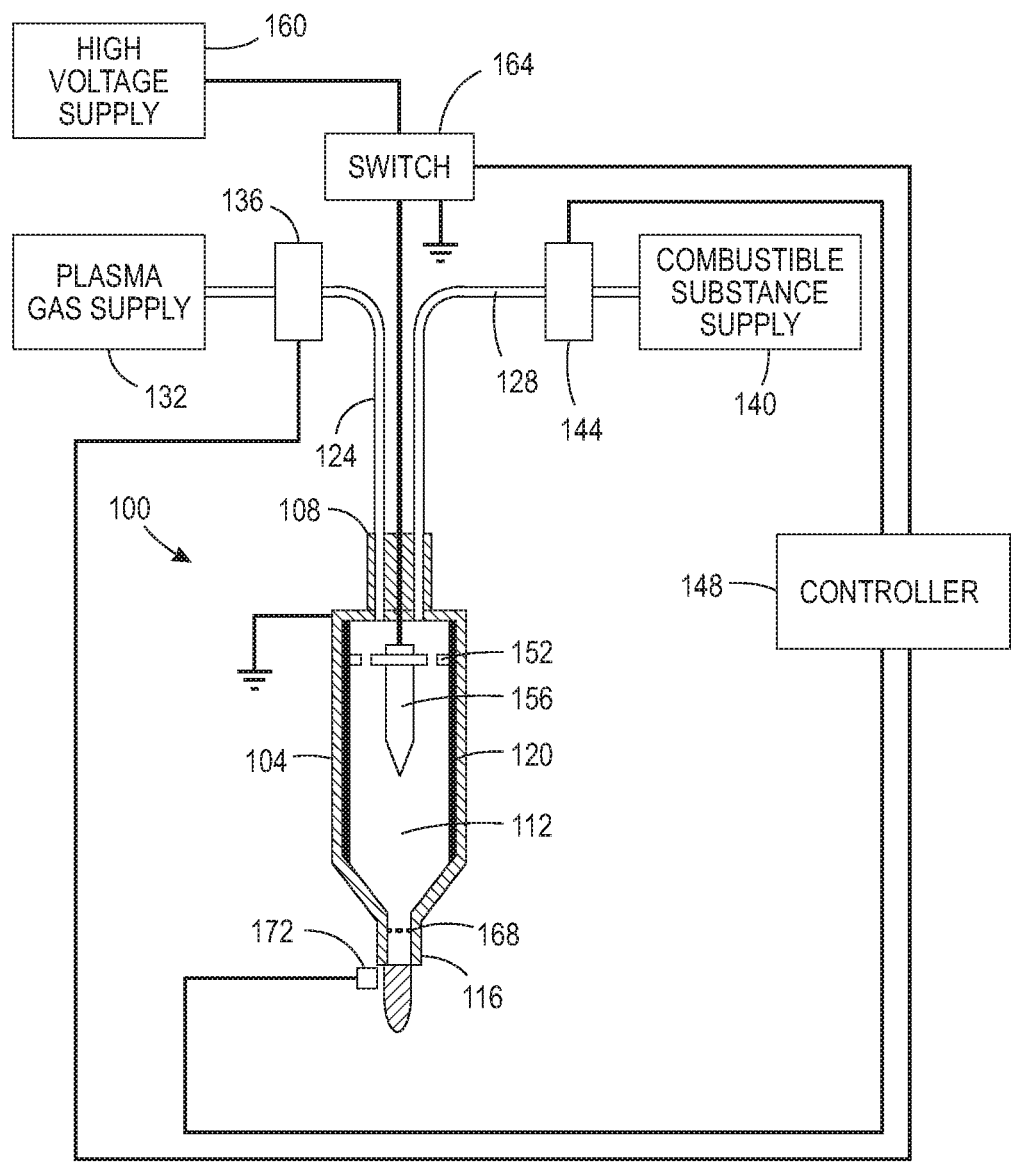
FIG. 1 is a schematic diagram of a device configured to apply both plasma gas and flame surface treatments to surfaces of objects.

For a general understanding of the environment for the object surface treatment device disclosed herein as well as the details for the device, reference is made to the drawings. In the drawings, like reference numerals designate like elements.

As used herein, the word "printer" encompasses any apparatus that produces images with one or more marking materials on media or objects. As used herein, the term "process direction" (P) refers to a direction of movement of an object through a printer having at least one printhead or through a surface treatment system having a plurality of surface treatment devices. As used herein, the term "cross-process" direction (CP) refers to an axis that is perpendicular to the process direction. As used in this document, the word "surface treatment" means any process that raises the surface energy of a material to improve the wettability and durability of ink on the surface.

FIG. 1 is a schematic diagram of a surface treatment device configured to provide two types of surface treatments, namely, atmospheric gas plasma surface treatment and flame surface treatment. The device 100 includes an electrically conductive housing 104 mounted to one end of a support arm 108. The housing is electrically grounded to prevent electrical charge from accumulating on the surface of the housing. The housing 104 encloses an open chamber 112 that terminates into a nozzle 116 at an end of housing 104 opposite the end mounted to the support arm 108. An electrical insulator 120 is formed against the wall of the chamber 112, but it does not extend into the tapered portion of housing 104 that forms the nozzle 116. Two fluid paths 124 and 128 are formed in the support arm 108 to supply different materials to the chamber 112. Fluid path 124 is connected to a plasma gas supply 132 through a valve 136, while fluid path 128 is connected to a combustible substance supply 140 through a valve 144. A controller 148 is operatively connected to valves 136 and 144 to operate the valves to open and close the valves selectively and connect either the plasma gas supply 132 or the combustible substance supply 140, but not both simultaneously, to the chamber 112. The plasma gas or the combustible substance passes through a metering plate 152 to disperse the gas or the substance into the chamber 112 with a vortex-like flow. The metering plate is especially useful for ionizing swirling plasma gas when the device 100 is used to gas plasma treat a surface. Mounted to the metering plate 152 is an electrode 156 that is electrically connected to a high voltage supply 160 through an electrical switch 164. The switch 164 is operatively connected to the controller 148 to enable the controller to selectively apply high voltage to the electrode 156. Igniter 172 is positioned adjacent the nozzle 116 to enable the controller to operate the igniter and produce a flame when the chamber is supplied with the combustible substance. A grid 168 is positioned within the nozzle 116 between chamber 112 and the exhaust end of nozzle 116. The grid is 168 is cross-hatch of metal strands that help ensure uniform gas and plasma flow from the nozzle 116 and that also help prevent backflow of flame into chamber 112 when the device is being used to flame treat a surface.

The device 100 includes three inputs for the chamber 112. One input is for connecting combustible source 140 to the surface treatment device 100 by the controller 140 operating the valve 144 in line 128 to open. When the valve is open, a combustible fluid or gas from the source 140 flows to the surface treatment device 100 so the gas fills the chamber 112 and begins to exhaust through the nozzle 116. After expiration of a predetermined time period that commences when the valve 144 was opened, the controller operates the igniter 172 of the device 100 to form a flame at the nozzle 116 for treatment of an object surface. When the flame surface treatment is complete, the controller 148 closes the valve 144 to terminate the flow of the combustible substance to the device 156. As used in this document, the term "combustible substance" means a gas or fluid that flows under pressure and that ignites to form a flame. Such materials include propane and natural gas, for example.

The second input for the device 100 is form line 124 to enable chamber 112 to receive a plasma gas through valve 136. Valve 136 can be a multi-input valve that is pneumatically connected to a plurality of sources of plasma gases that are useful to produce plasma for surface treatment of objects as described below with reference to FIG. 2. The controller 148 operates the multi-input valve to couple one of the sources of plasma gases to the device 100 through fluid path 124 exclusively. The controller 148 also operates the switch 164 to enable the high voltage from the supply 160 to form a plasma with the plasma gas swirling in the chamber 112. By selectively operating the surface treatment device 100, the plasma discharged from the surface treatment device 100 can be applied to different areas of an object surface selectively. After one or more plasmas are appropriately applied to the object surface, the controller operates the multi-input valve to decouple the connected source of plasma gas from the surface treatment device 100. As used in this document, "plasma gas" means any gas that produces plasma in the presence of an electric voltage or current. Such gases include, for example, oxygen, argon, nitrogen, hydrofluorocarbons, and carbon tetrachloride. The third input to device 100 enables the electrical line from switch 164 to supply a high voltage signal to the electrode 156 within the chamber 112.

Figure 2:
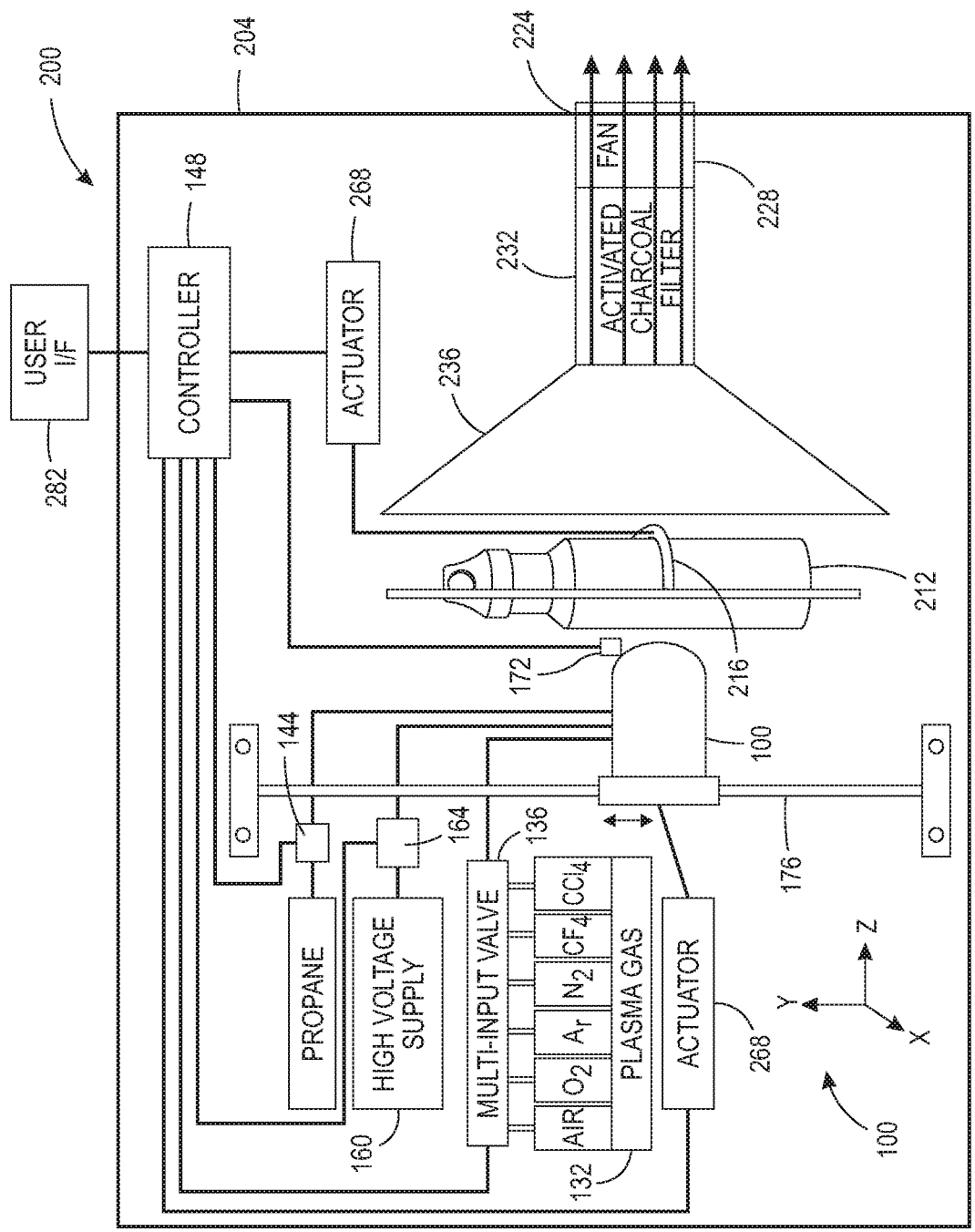
FIG. 2 is a schematic diagram of a system configured with the device of FIG. 1 to apply both plasma gas and flame surface treatments to multiple types of object materials immediately prior to the objects being printed.

FIG. 2 is a schematic diagram of a system 200 configured to operate the surface treatment device 100 to apply either plasma gas or flame treatments to multiple types of object materials immediately prior to the objects being printed. The system includes a housing 204 in which a surface treatment device 100 is configured to treat the surfaces of objects 212 carried by a holder 216. In FIG. 2, the object 112 is a water bottle, but the holder can be configured to secure other types of objects. As used in this document, the word "secure" means a structure configured to maintain an object in a particular orientation until the object is released from the structure. The housing 204 includes walls that enclose the device 100, the holder 216, and the object 212 to contain the materials used to treat the surface of an object. One wall of the housing 204 includes a vent opening 224 in which a fan 228 is positioned to pull materials and fumes from an overspray structure 236 through a filter 232. Thus, the materials used and the fumes produced by the materials can be removed from the air surrounding the object 212 and filtered before being exhausted from the housing 204. The system 100 includes a plurality of plasma gas sources that are coupled to the device 100 independently to enable the formation of different plasmas for surface treatments of the object 212. As used in this document, the term "coupled independently" or its equivalent means to couple a source in a plurality of sources to a device while the other sources in the plurality are not coupled. As used in this document, a "source" is a container configured to hold and deliver a substance to a surface treatment device to enable the surface treatment device to treat the surface of an object.

With continued reference to FIG. 2, the system 200 includes the controller 148 that is operatively connected to the valve 144 to selectively couple combustible material source 140 to device 100 to enable surface treatment device 100 to flame treat the surface of an object 212 as described above. The controller 148 is also operatively connected to the multi-input valve 136 to selectively couple one of the plasma gas sources in supply 132 to the device 100 to enable surface treatment device 100 to plasma treat the surface of an object 212 as described above. The controller 148 is also operatively connected to actuators 268 for moving surface treatment device 100 along a support member 176 and manipulating the position of the object 212. After an object 212 is secured within holder 216, the controller 148 can operate an actuator 268 to move the surface treatment device 100 bidirectionally along the support member 176 and to operate another actuator 268 to rotate the holder 216 and the object 212 to present various surfaces to the surface treatment device 100 for treatment.

The controller 148 can be configured with programmed instructions stored in a memory operatively connected to the controller to enable the controller to perform different types of surface treatments on one or more objects. A controller so configured can perform the process 300 shown in FIG. 3. To enable the performance of this process in one embodiment of the system shown in FIG. 3, a user interface 282 is provided so a user can input a code that identifies an object and the material of which the object is made. Other methods of entering a code include a bar code reader or other indicia detecting sensors.

Figure 3:
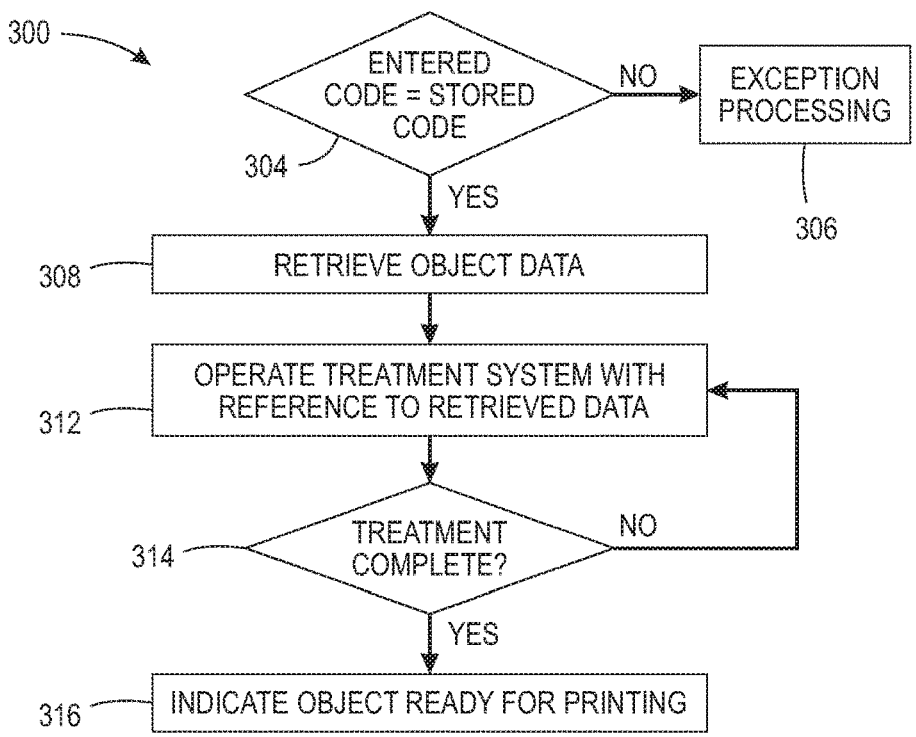
FIG. 3 is a flow diagram that can be performed by the system of FIG. 2.

With reference to FIG. 3, the process 300 begins with the controller comparing a code entered for an object with codes stored in the memory connected to the controller (block 304). If the code corresponds to one stored in the memory, the controller obtains data regarding the physical configuration of the object and the one or more treatments to be applied to the object (block 308). Otherwise, exception processing is performed to address the error (block 306). The controller operates the device 100 as described above to apply at least one of the plasma gas or flame treatment to at least one area of the object surface (block 312). This processing can include multiple plasma gas surface treatments being applied to one or more same areas of the object, multiple flame surface treatments being applied to one or more same areas of the object, or multiple treatments of both surface treatments being applied to one or more areas of the object. Once the surface treatment of the object is complete (block 314), the controller generates a signal indicating the object is ready for printing (block 316). This signal can activate a display or annunciator on the user interface 282 or other known device for indicating a system status.

Figure 4:
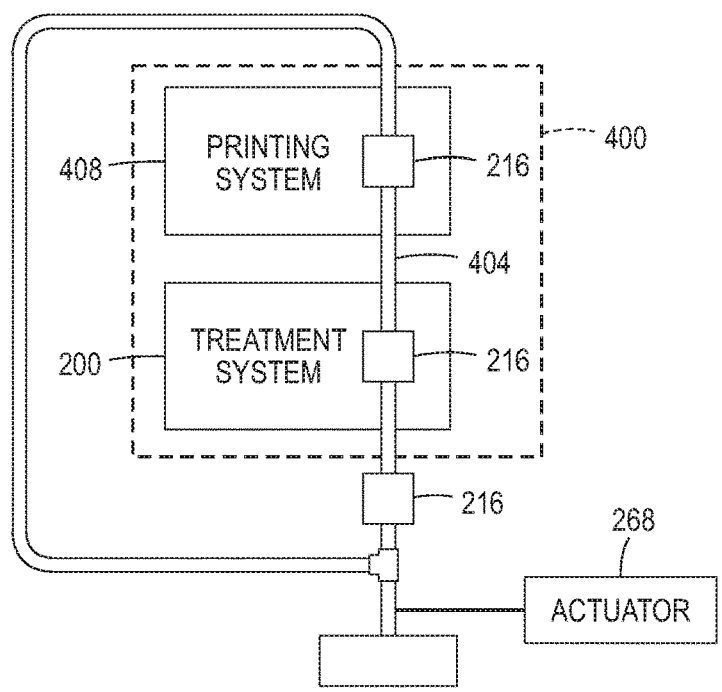
FIG. 4 is a block diagram of a system integrated with the system of FIG. 2.

FIG. 4 is a block diagram of a printer 400 that integrates a printing system 408 with the surface treatment system 200. In this printer, the holder 216 is mounted for movement along support member 404 and the controller 148 operates actuator 268 to move the holder along the member. In this printer, the support member extends out of the system 200 to position the holder 216 at an initial position where an object can be mounted in the holder for movement into the system 200. After the object is moved into the system 200, the system is operated as previously described to treat the surface of the object. When surface treatment of the object is completed, the controller operates actuator 268 to directly convey the object from the system 200 into the printing system 408. As used in this document, the term "directly conveyed" means a movement of an object from a surface treatment system to a printing system without removal of the object from the holder used to secure the object within the surface treatment system. Printing system 408 is a DTO printer having a controller that detects the entry of the treated object and operates the printing system to eject marking materials on the treated surface of the object to form ink images on the object. The printing system 408 removes the object from the holder 216 and ejects the printed object from the printer. The member 404 can be configured with at least two holders to enable a treated object to be printed, while an untreated object is subjected to at least one of the treatment processes in system 200. If the member 404 includes at least three holders 216, then the system 200 and the printing system 408 of the printer 400 are configured for continuous operation to treat and print a limited run of similar objects because an untreated object can be positioned in a holder 216 while another untreated object is being treated within system 200 and a treated object is being printed in printing system 408 and operation of the actuator 268 moves the holder 116 from the printing system 408 to the feed position below the treatment system 200 while the other two holders 116 are moved into the treatment system 200 and the printing system 408.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An object surface treatment system comprising:
a holder configured to secure an object within the holder; and
an object surface treatment device configured to produce both a plasma and a flame, but not both simultaneously;
a plurality of sources configured to supply a plurality of substances to the object surface treatment device; and
a controller operatively connected to the plurality of sources for the object surface treatment device, the controller being configured to pneumatically couple each source to the object surface treatment device independently of the other sources in the plurality of sources to operate the object surface treatment device for treatment of the surface of the object with the plasma alone, the flame alone, or both the plasma and the flame independently of each other.

2. The object surface treatment system of claim 1 further comprising:
a support member to which the holder is mounted;
an actuator operatively connected to the holder; and
the controller being operatively connected to the actuator, the controller being further configured to operate the actuator to move the holder along the support member to a position opposite the surface treatment device to enable the surface treatment device to treat the surface of the object with the plasma alone, the flame alone, or both the plasma and the flame.

3. The object surface treatment system of claim 2 wherein the controller is further configured to operate the actuator to rotate the holder about the support member.

4. The object surface treatment system of claim 3 further comprising:
a support member to which the object surface treatment device is mounted;
an actuator operatively connected to the object surface treatment device; and
the controller being operatively connected to the actuator, the controller being further configured to operate the actuator to move the object surface treatment device along the support member to a position opposite the object in the holder to enable the object surface treatment device to treat the surface of the object with the plasma alone, the flame alone, or both the plasma and the flame independently of each other.

5. The object surface treatment system of claim 4 further comprising:
a data input device operatively connected to the controller; and
the controller being further configured to receive data from the data input device and to operate the actuator and to operate the object surface treatment device with reference to the data received from the data input device.

6. The object surface treatment system of claim 5, the object surface treatment device further comprising:
a housing with at least one wall forming an internal chamber, a portion of the wall forming a nozzle that fluidly communicates with the internal chamber;
an electrode that extends into the internal chamber of the housing;
an igniter positioned adjacent the nozzle;
a source of combustible substance operatively connected to the internal chamber of the housing;
a first valve operatively connected between the housing and the source of combustible substance;
a source of at least one plasma gas being operatively connected to the internal chamber of the housing;
a second valve operatively connected between the source of the at least one plasma gas and the internal chamber of the housing, the valve being configured to pneumatically couple the source of the at least one plasma gas to the internal chamber of the housing independently;
a high voltage source operatively connected to the electrode;
an electrical switch operatively connected between the electrode and the high voltage source; and
the controller being operatively connected to the first valve, the second valve, and the electrical switch, the controller being further configured to operate the first valve to pneumatically connect the surface treatment device to the source of combustible substance selectively, to operate the second valve to pneumatically couple the surface treatment device to the source of the at least one plasma gas plasma gasses independently of the combustible substance source, to operate the electrical switch to connect the high voltage source to the electrode to produce a plasma at the nozzle, and to operate the igniter to produce a flame at the nozzle.

7. The object surface treatment system of claim 6 wherein the second valve is a multi-input valve and the source of the at least one plasma gas further comprises:
a plurality of plasma gas sources operatively connected to the multi-input valve; and
the controller is operatively connected to the multi-input valve, the controller being further configured to operate the multi-input valve to couple one of the plasma gas sources to the internal chamber of the housing independently of the other plasma gas sources in the plurality of plasma gas sources.

8. The object surface treatment system of claim 7 wherein the electrical switch is further configured to connect electrical ground to the electrode; and
the controller is further configured to operate the electrical switch to connect the electrode to electrical ground in response to the source of combustible substance being connected to the internal chamber of the housing.

9. An object surface treatment system comprising:
a holder configured to secure an object within the holder;
a surface treatment device configured to produce both a plasma and a flame, but not both simultaneously, to treat a surface of the object within the holder with a flame alone, a plasma alone, or both a plasma and a flame independently of each other;
a support member to which the surface treatment device is mounted;
an actuator operatively connected to the surface treatment device;
a plurality of sources configured for connection to the surface treatment device;
a controller operatively connected to the actuator and the plurality of sources, the controller being configured to operate the actuator to move the object surface treatment device along the support member to a position opposite the object in the holder, to pneumatically couple each source in the plurality of sources to the object surface treatment device independently of the other sources in the plurality of sources, and to operate the object surface treatment device for treatment of the surface of the object with the plasma alone, the flame alone, or both the plasma and the flame independently of each other.

10. The object surface treatment system of claim 9 further comprising:
   a support member to which the holder is mounted;
   an actuator operatively connected to the holder; and
   the controller being operatively connected to the actuator, the controller being further configured to operate the actuator to move the holder along the support member to a position opposite the object surface treatment device to enable the object surface treatment device to treat the surface of the object with the plasma alone, the flame alone, or both the plasma and the flame independently of each other.

11. The object surface treatment system of claim 10 wherein the controller is further configured to operate the actuator to rotate the holder about the support member.

12. The object surface treatment system of claim 11 further comprising:
   a data input device operatively connected to the controller; and
   the controller being further configured to receive data from the data input device and to operate the actuator and to operate the object surface treatment device with reference to the data received from the data input device.

13. The object surface treatment system of claim 12, the object surface treatment device further comprising:
   a housing with at least one wall forming an internal chamber, a portion of the wall forming a nozzle that fluidly communicates with the internal chamber;
   an electrode that extends into the internal chamber of the housing;
   an igniter positioned adjacent the nozzle;
   a source of combustible substance operatively connected to the internal chamber of the housing;
   a first valve operatively connected between the housing and the source of combustible substance;
   a source of at least one plasma gas being operatively connected to the internal chamber of the housing;
   a second valve operatively connected between the source of the at least one plasma gas and the internal chamber of the housing, the valve being configured to pneumatically couple the source of the at least one plasma gas to the internal chamber of the housing independently;
   a high voltage source operatively connected to the electrode;
   an electrical switch operatively connected between the electrode and the high voltage source; and
   the controller being operatively connected to the first valve, the second valve, and the electrical switch, the controller being further configured to operate the first valve to pneumatically connect the surface treatment device to the source of combustible substance selectively, to operate the second valve to pneumatically couple the object surface treatment device to the source of the at least one plasma gas plasma gasses independently of the combustible substance source, to operate the electrical switch to connect the high voltage source to the electrode to produce a plasma at the nozzle, and to operate the igniter to produce a flame at the nozzle.

14. The object surface treatment system of claim 13 wherein the second valve is a multi-input valve and the source of the at least one plasma gas further comprises:
   a plurality of plasma gas sources operatively connected to the multi-input valve; and
   the controller is operatively connected to the multi-input valve, the controller being further configured to operate the multi-input valve to couple one of the plasma gas sources to the internal chamber of the housing independently of the other plasma gas sources in the plurality of plasma gas sources.

15. The object surface treatment system of claim 14 wherein the electrical switch is further configured to connect electrical ground to the electrode; and
   the controller is further configured to operate the electrical switch to connect the electrode to electrical ground in response to the source of combustible substance being connected to the internal chamber of the housing.

* * * * *